(12) United States Patent
Takada et al.

(10) Patent No.: US 11,216,741 B2
(45) Date of Patent: Jan. 4, 2022

(54) ANALYSIS APPARATUS, ANALYSIS METHOD, AND NON-TRANSITORY COMPUTER READABLE MEDIUM

(71) Applicant: KABUSHIKI KAISHA TOSHIBA, Tokyo (JP)

(72) Inventors: Masaaki Takada, Tokyo (JP); Takeichiro Nishikawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 975 days.

(21) Appl. No.: 15/692,796

(22) Filed: Aug. 31, 2017

(65) Prior Publication Data

US 2018/0260726 A1 Sep. 13, 2018

(30) Foreign Application Priority Data

Mar. 13, 2017 (JP) .............................. JP2017-047837

(51) Int. Cl.
*G06N 7/00* (2006.01)
*G06F 17/18* (2006.01)
*G06K 9/62* (2006.01)

(52) U.S. Cl.
CPC ............. *G06N 7/005* (2013.01); *G06F 17/18* (2013.01); *G06K 9/6232* (2013.01)

(58) Field of Classification Search
CPC ....... G06F 17/18; G06K 9/6232; G06N 7/005
See application file for complete search history.

(56) References Cited

U.S. PATENT DOCUMENTS

| 8,515,719 B2 | 8/2013 | Tamaki et al. |
| 2002/0120591 A1* | 8/2002 | Keller ................... G06F 17/18 |
| | | 705/500 |

(Continued)

FOREIGN PATENT DOCUMENTS

| JP | 2012-74007 A | 4/2012 |
| JP | 5108116 | 12/2012 |

(Continued)

OTHER PUBLICATIONS

Nakahara et al. (Prediction model using micro-clustering, Aug. 2014, pp. 1488-1494) (Year: 2014).*

(Continued)

*Primary Examiner* — George Giroux
(74) *Attorney, Agent, or Firm* — Finnegan, Henderson, Farabow, Garrett & Dunner L.L.P.

(57) ABSTRACT

A regression analysis apparatus includes a regression model constructor and a similar feature extractor. A regression model constructor is configured to construct a regression model that represents an objective variable with a plurality of explanatory variables that correspond to any one of a plurality of features and with a regression coefficient of the plurality of explanatory variables by performing regression analysis using analysis target data including the plurality of features with one of the plurality of features as the objective variable. A similar feature extractor is configured to calculate a similarity degree between a feature other than a feature that corresponds to the objective variable in the analysis target data and the plurality of explanatory variables, and each of the plurality of explanatory variables, and configured to extract a similar feature having the similarity degree higher than a predetermined value.

18 Claims, 9 Drawing Sheets

(56) References Cited

U.S. PATENT DOCUMENTS

| | | | |
|---|---|---|---|
| 2006/0157029 A1* | 7/2006 | Suzuki | F02P 5/1514 123/406.33 |
| 2010/0161386 A1* | 6/2010 | Rabalais | G06Q 10/0635 705/7.28 |
| 2011/0066299 A1* | 3/2011 | Gray | F24F 11/30 700/291 |
| 2011/0066411 A1* | 3/2011 | Morio | G01H 17/00 703/2 |
| 2014/0143192 A1* | 5/2014 | Nagakura | G06Q 30/0202 706/21 |
| 2017/0103148 A1 | 4/2017 | Natsumeda | |

FOREIGN PATENT DOCUMENTS

| | | |
|---|---|---|
| JP | 2015-64856 A | 4/2015 |
| WO | WO 2015-145500 | 1/2015 |
| WO | WO 2016-088362 | 6/2016 |

OTHER PUBLICATIONS

Tibshirani, R. (1996). "Regression shrinkage and selection via ths lasso", Journal of the Royal Statistical Society. Series B (Methodological). 267-288.

Yuan, M., & Lin, Y. (2008). "Model selection and estimation in regression with grouped variables", Journal of the Royal Statistical Society: Series B (Statistical Methodology), 66 (1). 49-67.

* cited by examiner

| y | x1 | x2 |
|---|---|---|
| 5.1 | 2.3 | 1.1 |
| 1.9 | 1.2 | 1.5 |
| 3.3 | 0.3 | 1.9 |
| 2.2 | 0.9 | 0.1 |

FIG.3

| y | x1 | x2 | x3 |
|---|---|---|---|
| 5.1 | 2.3 | 1.1 | A |
| 1.9 | 1.2 | 1.5 | B |
| 3.3 | 0.3 | 1.9 | A |
| 2.2 | 0.9 | 0.1 | C |

FIG.4

| y | x1 | x2 | x3[A] | x3[B] | x3[C] |
|---|---|---|---|---|---|
| 5.1 | 2.3 | 1.1 | 1 | 0 | 0 |
| 1.9 | 1.2 | 1.5 | 0 | 1 | 0 |
| 3.3 | 0.3 | 1.9 | 1 | 0 | 0 |
| 2.2 | 0.9 | 0.1 | 0 | 0 | 1 |

FIG.5

| y | x1 | x2 | x3[A] | x3[B] | x3[C] |
|---|---|---|---|---|---|
| | g1 | g2 | g3 | | |
| 5.1 | 2.3 | 1.1 | 1 | 0 | 0 |
| 1.9 | 1.2 | 1.5 | 0 | 1 | 0 |
| 3.3 | 0.3 | 1.9 | 1 | 0 | 0 |
| 2.2 | 0.9 | 0.1 | 0 | 0 | 1 |
FIG.12
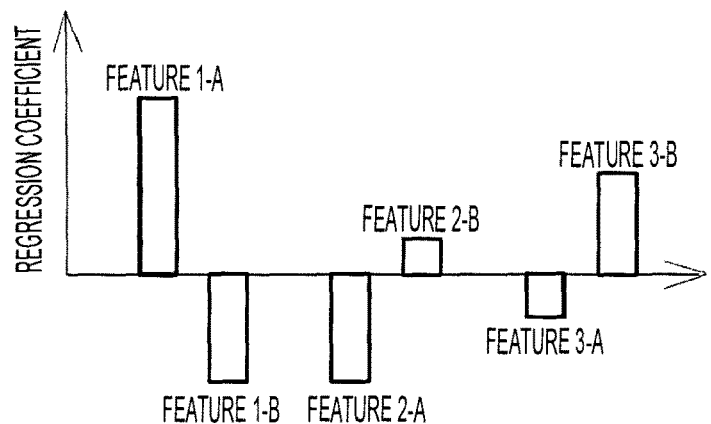
FIG.13
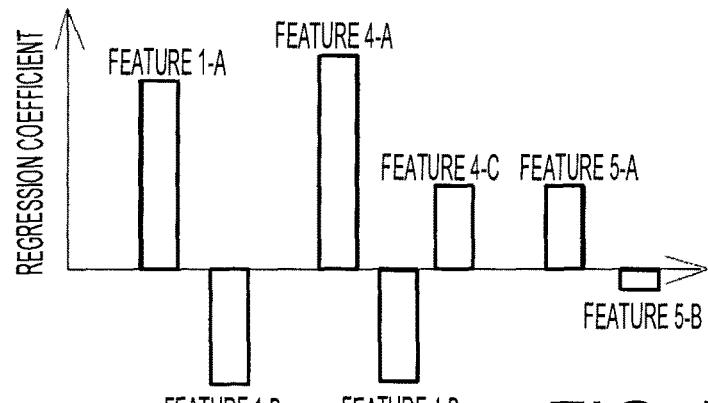
FIG.14

ANALYSIS APPARATUS, ANALYSIS METHOD, AND NON-TRANSITORY COMPUTER READABLE MEDIUM

CROSS-REFERENCE TO RELATED APPLICATIONS

This application is based upon and claims the benefit of priority from Japanese Patent Application No. 2017-047837, filed on Mar. 13, 2017; the entire contents of which are incorporated herein by reference.

FIELD

Embodiments described herein relate to a regression analysis apparatus, a regression analysis method, and a non-transitory computer readable medium.

BACKGROUND

In management of plants such as water supply and sewerage plants, power plants, chemical plants, it is widely practiced to construct a regression model with an important quality index as an objective variable and various features as explanatory variables and to estimate an influence degree of the feature. Moreover, in a case where there are many explanatory variables, it is possible to automatically extract features and construct a regression model using a penalized regression model.

The technique of the penalized regression model, however, is not configured to extract a feature similar to the feature selected as the explanatory variable. This leads to a problem that important factors are likely to be overlooked.

BRIEF DESCRIPTION OF THE DRAWINGS

FIG. 3 is a diagram illustrating an example of an objective variable and an explanatory variable;
FIG. 4 is a diagram illustrating an example of an objective variable and an explanatory variable having a categorical variable;
FIG. 5 is a diagram illustrating an exemplary explanatory variable in which a categorical variable is converted into a dummy variable;
FIG. 12 is a diagram illustrating an example of grouped explanatory variables;
FIG. 13 is a diagram illustrating an exemplary result display of regression coefficients for grouped explanatory variables;
FIG. 14 is a diagram illustrating an exemplary result display of regression coefficients for grouped similar features.

DETAILED DESCRIPTION

According to one embodiment, an analysis apparatus includes a regression model constructor and a similar feature extractor. A regression model constructor is configured to construct a regression model that represents an objective variable with a plurality of explanatory variables that correspond to any one of a plurality of features and with a regression coefficient of the plurality of explanatory variables by performing regression analysis using analysis target data including the plurality of features with one of the plurality of features as the objective variable. A similar feature extractor is configured to calculate a similarity degree between a feature other than the feature that corresponds to the objective variable in the analysis target data and the plurality of explanatory variables, and each of the plurality of explanatory variables, and configured to extract a similar feature having the similarity degree higher than a predetermined value.

Hereinafter, embodiments of the present invention will be described in detail with reference to the drawings.

First Embodiment

An analysis apparatus according to the present embodiment is an analysis apparatus configured to extract a feature to be a factor of variation in a specific characteristic value in a data management system that accumulates data generated by an industrial process implemented in a water supply and sewerage plant, a power plant, and a chemical plant. The data includes values (sensor values) obtained from a sensor installed in the process, and setting values such as a process condition and an objective value, set by an administrator. In particular, a characteristic value important for quality (hereinafter referred to as an important characteristic value) among the data is continuously monitored. In quality control, variation in the important characteristic value (objective variable) or a symptom for variation is detected, a factor of variation is identified, and a countermeasure is examined and implemented. The analysis apparatus assists identification of the factor of variation of the important characteristic value.

Figure 1:
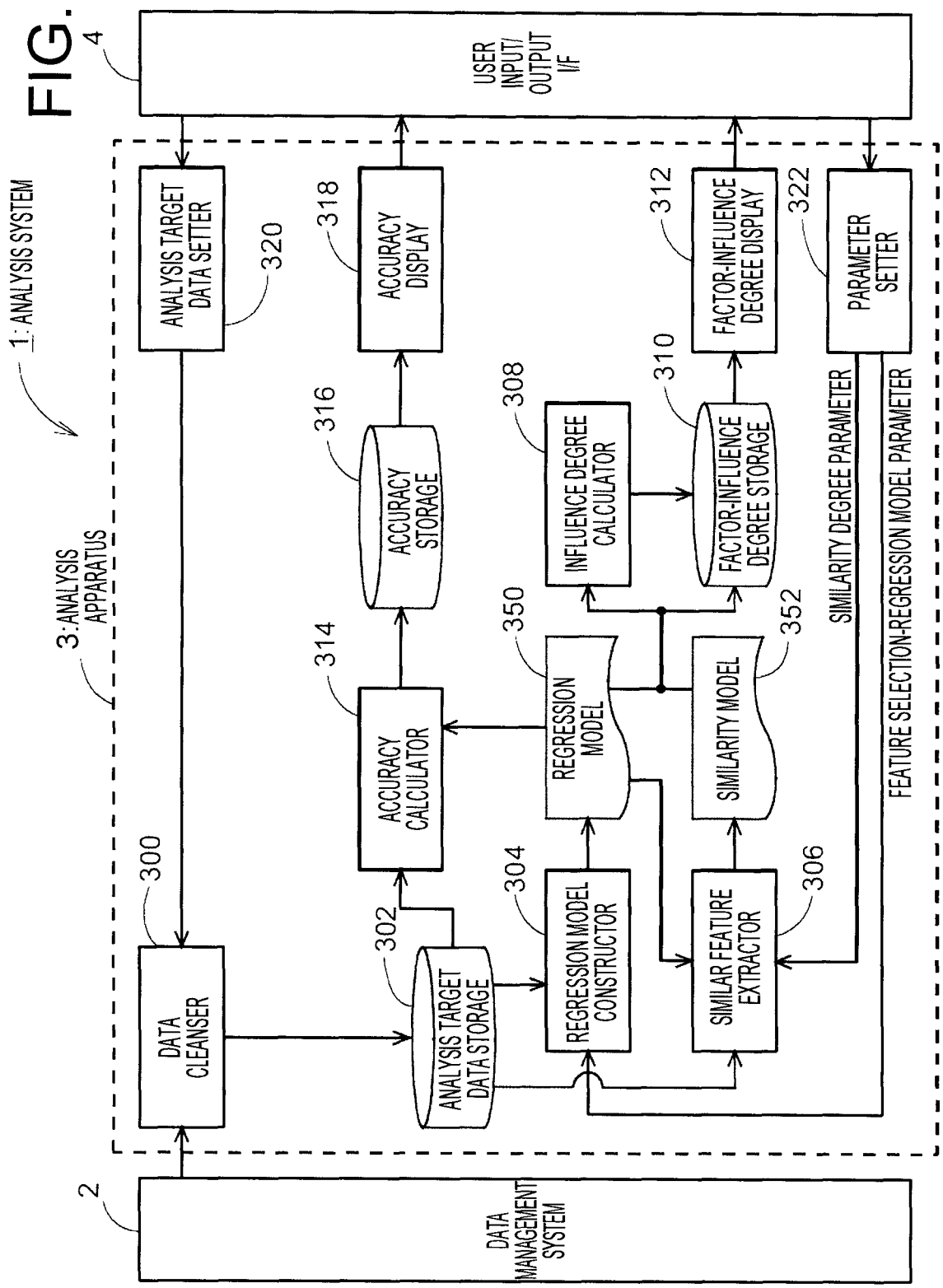
FIG. 1 is a block diagram of an analysis apparatus according to a first embodiment.

FIG. 1 is a block diagram illustrating an analysis system 1 according to the present embodiment. The analysis system 1 includes a data management system 2, an analysis apparatus 3, and a user input/output interface 4 (hereinafter referred to as a user input/output I/F 4).

The data management system 2 is a system that manages data generated during an industrial process of a plant, and includes a database, for example. In FIG. 1, while the data management system 2 is configured to be provided separately from the analysis apparatus 3, the configuration is not limited to this and may be provided within the analysis apparatus 3.

The analysis apparatus 3 is an apparatus configured to identify a factor of variation of an important characteristic value as an objective variable on the basis of data accumulated in the data management system 2, and includes a data cleanser 300, an analysis target data storage 302, a regression model constructor 304, a similar feature extractor 306, a factor-influence degree storage 310, a factor-influence degree display 312, an accuracy calculator 314, an accuracy storage 316, an accuracy display 318, an analysis target data setter 320, and a parameter setter 322.

The data cleanser 300 obtains data stored in the data management system 2, processes the obtained data as necessary, and generates analysis target data. In the acquisition of data, the user designates the period and feature, and uses predetermined setting items and setting values. As processing of the obtained data, in a case where the data include a defect, or the like, missing processing and abnormal value processing are performed, and in a case where there is a categorical variable, processing such as conversion into a dummy variable is performed.

In the missing processing, in a case where there are missing data, the missing data are removed or interpolated with other data. In the abnormal value processing, in a case where there is an abnormal value in the data, the value is corrected to be within an appropriate range, or removed. In the dummy variable processing, in a case where the values include a categorical value (discrete value) such as A, B, the categorical value is converted into a dummy variable of 0 or 1. The analysis target data generated in this manner include a plurality of features each of which corresponding to a different time. A set of the features at each of the individual times is also referred to as a sample.

The data cleanser 300 stores the analysis target data in the analysis target data storage 302. In the present embodiment, an important characteristic value among the plurality of features is treated as an objective variable. Other features (characteristic values) are treated as explanatory variables.

Note that the objective variable, that is, the important characteristic value may be separately held in the data management system 2 beforehand. In this case, the data cleanser 300 performs the above-described missing processing, or the like, without extracting the objective variable, and stores objective variable data on the data management system 2 and the analysis target data that have undergone data cleansing, in the analysis target data storage 302.

The regression model constructor 304 constructs a regression model that explains the variation with respect to the important characteristic value as the objective variable. Various parameters needed for constructing the regression model are set by the parameter setter 322. When the number of samples is n, the number of features is p, the objective variable is $y \in R^n$, the explanatory variable is $X \in R^{n \times p}$, and the regression coefficient is $\beta \in R^p$, the regression model is expressed as $y = X\beta$. It is allowable to add a constant term $\alpha$ to be: $y = X\beta + \alpha$.

In a case where the feature is enormous, there is a need to select the feature (feature selection) as the explanatory variable in order to suppress overfitting and enhance interpretability. As a method for simultaneously executing feature selection and regression model construction, there is a penalized regression model. In the penalized regression model, a penalty term corresponding to the regression coefficient is added to a likelihood function of the regression model and optimization is performed. A representative technique is least absolute selection and shrinkage operator (Lasso). Lasso is reduced to the optimization problem expressed by the following formula (1).

$$\min_{\beta} \frac{1}{2n} \|y - X\beta\|_2^2 + \lambda \|\beta\|_1 \quad (1)$$

For $X(=\{x_1, x_2, \ldots, x_p\})$ in formula (1), $x_j$ has been transformed such that the mean is 0 and the standard deviation is 1, while y is converted such that the mean is 0. The norm sign in the formula is defined as follows for the vector $z = \{z_1, z_2, \ldots, z_n\}$.

$$\|z\|_1 = |z_1| + |z_2| + \ldots + |z_n| \quad (2)$$

$$\|z\|_2 = \sqrt{z_1^2 + z_2^2 + \ldots + z_n^2} \quad (3)$$

$\|z\|_1$ and $\|z\|_2$ represent an L1 norm and an L2 norm of vector z, respectively.

By solving this optimization problem, Lasso simultaneously optimizes both feature selection and regression model construction. The applicable technique is not limited to Lasso but includes other penalized regression models such as Elastic Net, Ridge, Group Lasso, Adaptive Lasso, and smoothly clipped absolute deviation (SCAD). Moreover, even when it is a technique other than the penalized regression model, it is allowable to use a technique that outputs a regression model, for example, the stepwise technique using Akaike's information criterion (AIC) and Bayesian information criterion (BIC). Elements of the regression coefficient $\beta$ obtained by the above-described method include a nonzero element and a zero element, and the feature corresponding to the nonzero regression coefficient is to be selected. As another technique, it is allowable to select solely the feature corresponding to the element having a value of a threshold or more and larger than 0. The regression model constructor 304 outputs a regression model 350 including the selected feature and a regression coefficient for the feature.

The similar feature extractor 306 analyzes the similarity degree with the explanatory variable for the feature not selected as the explanatory variable by the regression model constructor 304 and extracts a similar feature having higher similarity degree compared with a predetermined value. Various parameters needed for extracting the similar feature are set by the parameter setter 322. The similarity degree is analyzed on the basis of the data stored in the analysis target data storage 302 and the regression model 350 (for example, the selected feature). For example, the analysis is performed by calculating a correlation coefficient and a partial correlation coefficient. In the case of using the correlation coefficient, when the selected feature is $x_j$ and the other feature (unselected feature) is $x_k$, the expression would be: $x_j^T x_k / n$. Note that, it is assumed that $x_j$ and $x_k$ are standardized such that the mean is 0 and the standard deviation is 1. Where, $x^T$ represents a transpose vector of vector x.

Moreover, the similarity degree may be a coefficient of determination of a result of performing a regression analysis, onto the contribution vector $\beta_j x_j$ of the feature (explanatory variable) $x_j$ selected by the regression model constructor 304, with each of the unselected features $x_k$, or may be the square root of the coefficient of determination. Specifically, for each of the combinations $(x_j, x_k)$ for all the explanatory variables $x_j$ selected by the regression model constructor 304 and all the unselected features $x_k$, the regression problem indicated by the following formula (4) is solved. Note that, it is assumed that $j \neq k$ in the following expression.

$$\min_{\beta_k}\|\beta_j x_j - \beta_k x_k\|_2^2 \qquad (4)$$

The coefficient of determination of this regression problem can be considered as similarity between $x_j$ and $x_k$. The coefficient of determination in the formula (4) is equal to the square of the correlation coefficient. By calculating similarity degree as a regression problem, it is possible to calculate the influence degree to be described later.

In a case where the similarity degree (the similarity degree between $x_j$ and $x_k$ is expressed as $r_{jk}$) is the predetermined threshold $\theta$ ($r_{jk} \geq \theta$) or more, $x_k$ is extracted as the similar feature. It is allowable to use a prefixed value as the threshold $\theta$ or use a value interactively set by the user. As an example, a value having a standardized correlation coefficient of 0.8 may be set as the predetermined threshold $\theta$. The value is not limited to this, and may be set in advance by the user or the system. This setting may be determined on the basis of the type of the plant, the situation of the plant, or the objective variable. Moreover, the threshold may be automatically determined according to conditions such as the number of selected features.

The similar feature extractor 306 outputs, for example, a combination of the feature $x_j$ selected by the regression model constructor 304, the similar feature $x_k$, the similarity degree $r_{jk}$, and the regression coefficient $\beta_k$, as a similarity model 352. The technique for calculating the similarity degree $r_{jk}$ is not limited to that described above, and any technique may be used as long as it is a technique for calculating similarity.

The influence degree calculator 308 calculates the influence degree, that is, an index indicating the influence of each of the explanatory variables on the objective variable on the basis of the regression model 350 constructed by the regression model constructor 304. Moreover, the influence degree calculator 308 calculates the influence degree, that is, an index indicating the influence of each of similar features on the objective variable on the basis of the similarity model 352 calculated by the similar feature extractor 306. Subsequently, the influence degree calculator 308 stores the calculated influence degree in the factor-influence degree storage 310.

In the present embodiment, for example, the regression coefficient $\beta_j$ of each of the explanatory variables in the regression model 350, or $\beta_j \sigma(x_j)$ obtained by multiplying the regression coefficient $\beta_j$ by standard deviation $\sigma(x_j)$ of $x_j$ is used as the influence degree of each of the explanatory variables on the objective variable.

This applied also to the influence degree of the similar feature, that is, the influence degree is quantification of the influence of each of the similar features on the objective variable. As the influence degree of the similar feature on the objective variable, for example, the regression coefficient $\beta_k$ of the similar feature output by the similar feature extractor 306, or $\beta_k \sigma(x_k)$ obtained by multiplying the regression coefficient $\beta_k$ by the standard deviation of the similar feature $x_k$, is used.

The factor-influence degree storage 310 stores the data of the regression model 350 output by the regression model constructor 304, the influence degree calculated by the influence degree calculator 308, and data of the similarity model 352 output by the similar feature extractor 306.

The factor-influence degree display 312 outputs various data stored in the factor-influence degree storage 310 and displays the data via the user input/output I/F 4. On the basis of the data displayed on the user input/output I/F 4, the user identifies a factor, performs re-setting of various parameters, or the like. The extracted features may be listed as the data to be displayed. Furthermore, the features in the list may be prioritized on the basis of their individual influence degrees and displayed in order of priority.

By displaying the regression coefficient $\beta_j$ for the feature $x_j$ extracted by the regression model constructor 304, the factor-influence degree display 312 can visualize a change amount of the objective variable in a case where the explanatory variable (feature value) is increased by one. In addition to this, the factor-influence degree display 312 can visualize the influence of explanatory variables (features) on the objective variable by displaying $\beta_j \sigma(x_j)$ as the influence degree.

Similarly for the similar feature, by displaying the regression coefficient $\beta_k$ of the similar feature output by the similar feature extractor 306, the factor-influence degree display 312 can visualize the change amount of the objective variable in a case where the similar feature is increased by one. Moreover, by displaying $\beta_k \sigma(x_k)$ as the influence degree of the similar feature, it is possible to visualize the influence of the similar feature on the objective variable.

The accuracy calculator 314 calculates accuracy of the regression model generated by the regression model constructor 304. The accuracy calculator 314 calculates accuracy of the regression model 350 by applying the analysis target data to the regression model 350 output by the regression model constructor 304. As the index of accuracy, a mean square error, a cross validation mean square error, a coefficient of determination, a coefficient of determination with degree of freedom adjustment, or the like, are used. The analysis target data to be input may be the same data as or different data from the data used for modeling. In this manner, the accuracy data calculated by the accuracy calculator 314 is stored in the accuracy storage 316.

Moreover, the regression analysis may be performed again on the basis of the accuracy calculated by the accuracy calculator 314. For example, by performing cross validation, calculation of accuracy, and regression analysis again on the basis of the accuracy by the accuracy calculator 314, it is possible to avoid problems such as overfitting (over-fitting) and enhance generalization performance.

The accuracy display 318 displays the accuracy data stored in the accuracy storage 316 for the user via the user input/output I/F 4. By checking the accuracy, the user can understand to what extent factors can be explained by the regression model. Moreover, the display of this accuracy may display an actual value of the objective variable and an estimated value obtained by substituting the explanatory variable data into the regression model. As a display method, displaying with numerical values and displaying with a graph are applicable.

The analysis target data setter 320 sets a period of data as analysis target and a feature to be used in the analysis. A predetermined value may be set in advance as the setting value. Moreover, it is also possible to check accuracy, or the like, and to change (extend, for example) the target period or exclude a specific feature from the analysis target in order to construct a model with higher accuracy, or to eliminate a factor (feature) recognized as an apparent error. It is allowable to allow this setting to be changeable by the user or be automatically changed on the basis of accuracy information, or the like.

For example, it is possible to suppress the influence of noise by extending the period of data as the analysis target than the current period in a case where the accuracy is lower than a predetermined value, and possible to avoid selection of an explanatory variable in a case where the influence degree of the explanatory variable on the objective variable is smaller than a predetermined value. It is also allowable to configure such that the analysis target data setter 320 can automatically set the period of data as the analysis target or set the feature to be excluded in a case where the above-described conditions are satisfied. Note that the setting method is not limited to this.

The parameter setter 322 sets a parameter used for constructing the regression model in the regression model constructor 304 and a parameter used for extracting the similar feature in the similar feature extractor 306. For the regression model construction parameter, for example, the regularization parameter $\lambda$ used for Lasso is set. It is also allowable to set a plurality of values for the regularization parameter $\lambda$ and to construct a plurality of regression models. In this case, the similar feature is extracted corresponding to each of the models. Moreover, as another example, weights of penalty terms may be set for individual features, and these weights of penalty terms may be prioritized in advance.

The parameter for extracting the similar feature is applied, for example, to set a threshold of the similarity degree to be used for extracting the similar feature. Similarly to the regression model construction parameters, it is also allowable to set a plurality of thresholds and perform analysis in a plurality of patterns. Moreover, it is also allowable to set the number of features to be extracted, or the like, and set a threshold corresponding to the number, or the like, automatically. For checking the accuracy and an extraction factor (extracted feature), expanding the extraction factor and performing prioritization, the user can change parameter setting via the parameter setter 322.

In a case where the user performs these settings, that is, the setting by the analysis target data setter 320 and the setting by the parameter setter 322, the user sets arbitrary values on individual setters via the user input/output I/F 4. By setting parameters in this manner, the analysis apparatus 3 adjusts the accuracy of the regression model construction and the similar feature to be extracted automatically or in accordance with an instruction from the user.

The user input/output I/F 4 is an interface for outputting information to the user and receiving an input from the user. For example, the user input/output I/F 4 includes an output device that outputs information to the user, such as a display, a tablet, a smartphone, a speaker, a printer, and an input device that receives an input from the user, such as a keyboard, a mouse, a touch panel, a microphone. Moreover, the user input/output I/F 4 may include a device having both an input device and an output device, such as a display with a touch panel.

Figure 2:
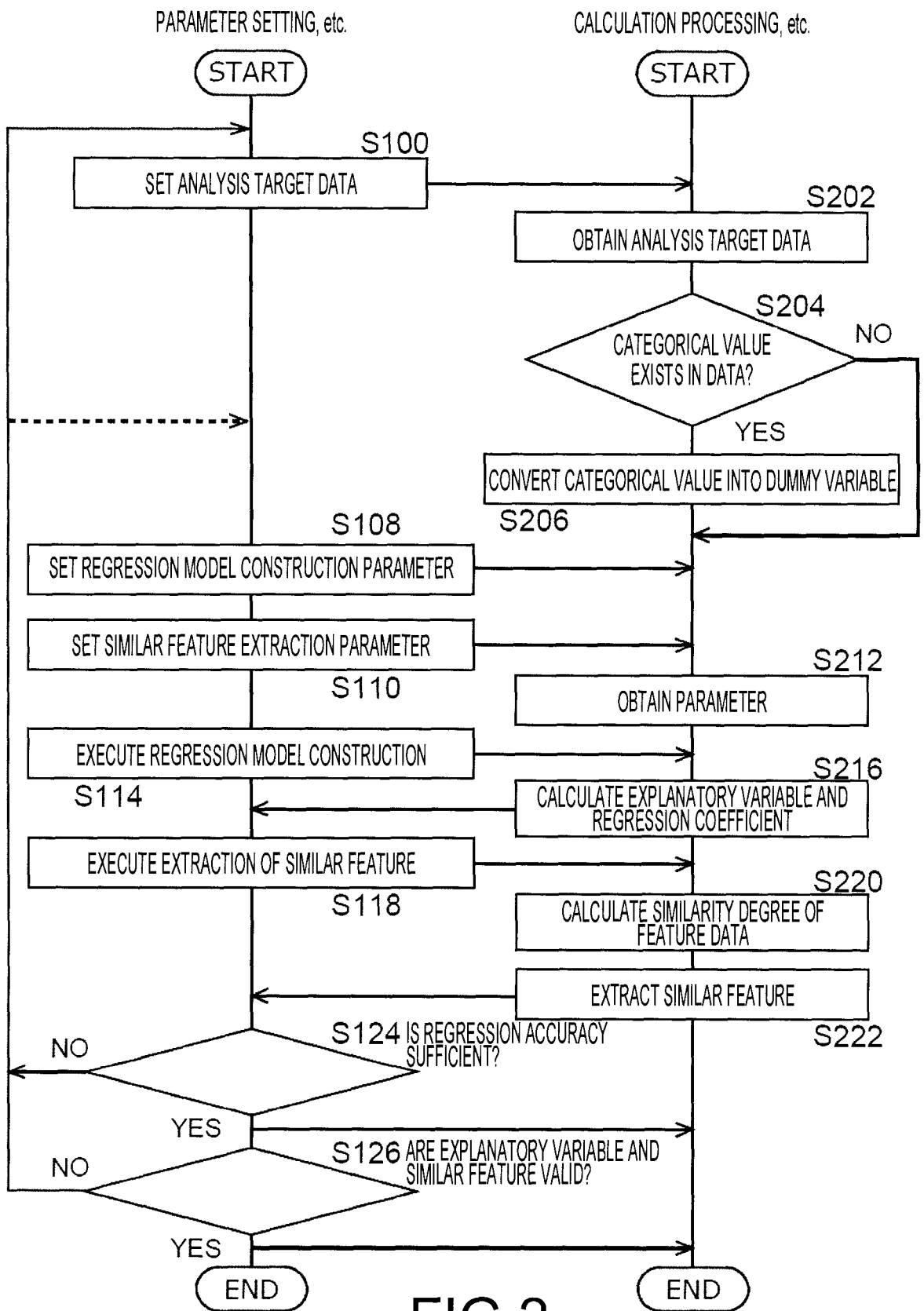
FIG. 2 is a flowchart illustrating exemplary analysis processing according to the first embodiment.

Individual processing will be described below with reference to flowcharts. First, regression model construction and similar feature extraction processing will be described. FIG. 2 is a flowchart illustrating a flow of processing of regression model construction processing and the similar feature extraction processing according to the present embodiment. The lane on the left side in the flowchart illustrates processing automatically performed by the analysis apparatus 3 such as parameter setting or the processing performed by the user at an arbitrary timing. The lane on the right side illustrates calculation processing, or the like, in the analysis apparatus 3. In a case where the processing of the left lane is executed by the user, it is allowable to arrange such that user's instruction waiting state is arranged after each of the processing. Note that in a case where the user sets parameters, or the like, the user sets parameters, or the like, on the analysis apparatus 3 via the user input/output I/F 4.

First, analysis target data setting is executed by the analysis target data setter 320 (S100). Conditions for obtaining analysis target data among data stored in the data management system 2 are set, and this setting is notified to the data cleanser 300.

Next, the data cleanser 300 that has received the notification performs acquisition processing of analysis target data among the data stored in the data management system 2 (S202). As described above, data acquisition is performed so as to obtain data stored in a set period, or the like. Moreover, cleaning processing such as data missing processing and abnormal value processing is also performed together with the acquisition processing.

FIG. 3 is a table illustrating an example of an objective variable y and features $x_1$, $x_2$, processed by the data cleanser 300. In this manner, a plurality of feature values exists for each of monitored objective variable values. For example, the figure indicates that the features are $x_1=2.3$ and $x_2=1.1$ in a case where an observation result is y=5.1.

Next, returning to FIG. 2, the data cleanser 300 determines whether a categorical value exists in the obtained data (S204). In a case where the categorical value exits (S204: Yes), the data cleanser 300 subsequently performs processing for converting the categorical value into a dummy variable. In contrast, in a case where no categorical value exists (S204: No), the processing in S206 is skipped.

For example, as illustrated in FIG. 4, in a case where the analysis target data includes a categorical value such as $x_3$, the processing in S206 sets a dummy variable as illustrated in FIG. 5 and stores it in the analysis target data storage 302. Specifically, while $x_3$ is a variable having a categorical value of A, B, or C, it is difficult to perform regression analysis as it is, and thus, dummy variables such as $x_3[A]$, $x_3[B]$, and $x_3[C]$ are set as illustrated in FIG. 5.

The values of the dummy variable are set such that the dummy variable corresponding to each of the categorical values is 1 and the other dummy variables are 0, so as to be set, for example, $x_3[A]=1$, $x_3[B]=0$, $x_3[C]=0$ in the case of $x_3=A$. In a case where there is a categorical value in this manner, the categorical value is converted into the dummy variable.

Next, returning to FIG. 2, the parameter setter 322 sets a regression model construction parameter (S108). The set regression model construction parameter is notified to the regression model constructor 304.

Next, the parameter setter 322 sets the similar feature parameter (S110). The set similar feature parameter is notified to the similar feature extractor 306. Note that there is no need to separately perform the processing in S108 and S110, and the parameter setter 322 may be configured to notify each of the set parameters to the regression model constructor 304 and the similar feature extractor 306 at a same timing.

Next, the regression model constructor 304 and the similar feature extractor 306 individually obtain parameters notified from the parameter setter 322 (S212). Thereafter, the regression model constructor 304 and the similar feature extractor 306 remain in a standby state until a regression model construction execution instruction and a similar feature extraction execution instruction are issued.

Next, the regression model construction execution instruction is issued (S114). In a case where the execution instruction is issued by the user, an instruction to construct a regression model is notified to the regression model constructor 304 via the user input/output I/F 4.

Next, the regression model constructor 304 that has received the execution instruction performs processing of calculating an explanatory variable and a regression coefficient for the objective variable stored in the analysis target data storage 302 (S216). As described above, this processing may simultaneously perform, using Lasso, for example, selection of an explanatory variable from analysis target data and construction of the regression model. The regression model constructor 304 outputs the regression model 350 including model component values such as the calculated regression coefficients to the accuracy calculator 314, the similar feature extractor 306, and the influence degree calculator 308, and together with this, stores the regression model 350 in the factor-influence degree storage 310. The factor-influence degree display 312 may be configured to output, at this timing, the fact that the regression model has been constructed and the regression model to the user via the user input/output I/F 4.

Next, a similar feature extraction execution instruction is issued (S118). In a case where the execution instruction is issued by the user, an instruction to perform similar feature extraction processing is notified to the similar feature extractor 306 via the user input/output I/F 4.

Next, the similar feature extractor 306 that received the execution instruction analyzes and calculates (S220) the degree of similarity degree between each of the features not extracted as an explanatory variable in S216 and each of the explanatory variables on the basis of the regression model 350 output by the regression model constructor 304 and the analysis target data stored in the analysis target data storage 302.

Subsequently, the similar feature extractor 306 extracts a similar feature having high similarity degree with the explanatory variable on the basis of the obtained similarity degree (S222). The similarity degree is determined by performing comparison with a predetermined threshold as described above. Data such as the extracted similar feature are stored in the factor-influence degree storage 310 as the similarity model 352. Similarly to the regression data, it is allowable to output the similarity model 352 to the user at this timing.

Note that while the above description is the case where the regression model constructor 304 and the similar feature extractor 306 receive instructions from the user via the user input/output I/F 4, the configuration is not limited to this. Specifically, the processing of constructing the regression model and the processing of extracting the similar feature may be configured to be performed immediately after the parameter acquisition processing in S212. In this case, the processing in S114 and S118 can be omitted. That is, it is allowable to cause the analysis apparatus 3 to automatically perform the processing instead of allowing the user to issue the execution instruction at an arbitrary timing.

Next, the accuracy calculator 314 calculates accuracy of the regression model and stores the calculated accuracy in the accuracy storage 316, and together with this, determines whether the regression accuracy is sufficiently high (S124). In a case where the regression accuracy is not sufficient (S124: No), the processing from S100 is repeated. Note that it is allowable to configure such that the accuracy display 318 outputs accuracy data stored in the accuracy storage 316 to the user via the user input/output I/F 4 and that the user judges the regression accuracy.

Next, in a case where the regression accuracy is sufficient (S124: Yes), determination is made as to whether the regression explanatory variable and the similar feature are valid (S126). Whether the features extracted as the regression model and the similarity model are valid is judged by the user on the basis, for example, the relationship between the feature displayed on the user input/output I/F 4 and the feature, user's findings about the process and a physical relationship. Moreover, the judgment may be performed by whether the feature having a known influence is included in the regression model or the similarity model.

In a case where the extracted feature is not valid (S126: No), processing from S100 is repeated. In this case, the period and the feature as an analysis target are adjusted. Moreover, instead of changing the analysis target data, it is allowable to repeat the processing from S108 as indicated by a dotted line in FIG. 2. In this case, for example, the regression parameter is adjusted or the threshold for the similarity degree is lowered such that a valid feature can be extracted. Examples of the case where the extracted feature is not valid include a case where the feature indicating a known factor is not included in any of the regression model and the similarity model displayed on the user input/output I/F 4, a case where the feature indicating a known factor is extracted as the similar feature but is not included in the regression model, a case where the regression model includes a feature which is obviously inappropriate, or a case where the similar feature is physically more valid than the feature of the regression model.

In a case where the extracted feature is valid (S126: Yes), for example, in a case where the feature indicating the known factor is included in the regression model displayed on the user input/output I/F 4 or in a case where the extracted feature can be judged to be physically valid, the analysis apparatus 3 finishes the processing.

Note that, while the regression accuracy and the validity of the extracted feature are judged successively in FIG. 2, the processing can also be performed independently. That is, it is allowable to configure to judge validity of the regression accuracy and the extracted feature at the timing at which the regression model 350 is calculated, and to perform regression model construction again in a case where the regression accuracy is not sufficient or the explanatory variable of the regression is not valid. Then, it is allowable to configure to determine the validity of the similar feature at the timing when the similar feature is extracted, and to perform construction of the regression model or extraction of the similar feature again, on the basis of the determination result. That is, after S216, processing in S S124 and of a portion of processing in S126 may be performed before S118.

Figure 6:
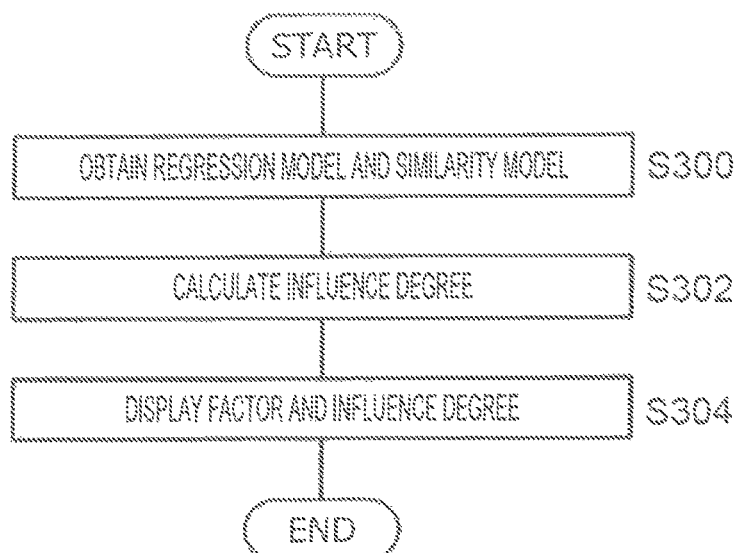
FIG. 6 is a flowchart illustrating exemplary influence display processing according to the first embodiment.

Next, an exemplary display of the factor and the influence degree will be described. FIG. 6 is a flowchart illustrating a flow of factor display processing.

First, the influence degree calculator 308 obtains the regression model 350 output by the regression model constructor 304 and the similarity model 352 output by the similar feature extractor 306 (S300). Note that, while the models are directly obtained in FIG. 1, it is allowable to configure such that the models are once stored in the factor-influence degree storage 310 and then obtained by the influence degree calculator 308.

Next, the influence degree calculator 308 calculates the influence degree from the obtained regression model 350 and the similarity model 352 (S302). As described above, the influence degree calculator 308 calculates the influence degree of each of the explanatory variables on the objective variable from the regression model 350, and calculates the influence degree of each of the similar features on the objective variable on the basis of the regression model 350 and the similarity model 352.

Next, the factor-influence degree display 312 outputs, to the user, explanatory variables and similar features, and the influence degree of the explanatory variables and similar features on the objective variables, calculated by the influence degree calculator 308, via the user input/output I/F 4 (S304). The output is executed, for example, by displaying it on a monitor provided in the user input/output I/F 4.

Figure 7A:
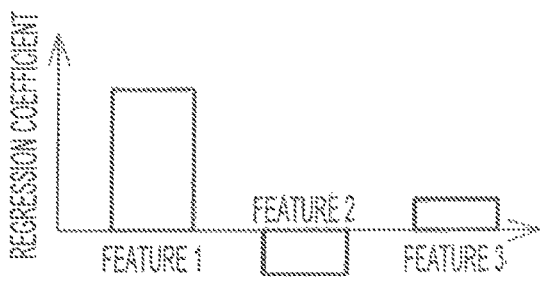
FIGS. 7A and 7B are diagrams illustrating an exemplary result display of regression coefficients of explanatory variables and similar features.

FIGS. 7A, 7B, 8A, and 8B are diagrams illustrating display examples of factors and influence degrees. FIG. 7A is a diagram illustrating an exemplary regression coefficient of an explanatory variable. The displayed graph represents a regression coefficient in the constructed regression model for a feature 1, a feature 2, and a feature 3 as explanatory variables. The graph illustrates an amount of change in the objective variable in a case where each of the explanatory variables increases by one. In the example of FIG. 7A, the amount of change of the objective variable in a case where each of the explanatory variables increases by one is greater in the feature 1, which is an explanatory variable, compared with the feature 2 and the feature 3, and the amounts of change of the objective variables in a case where the feature 2 and the feature 3 are increased are nearly equal with reversed signs.

Figure 7B:
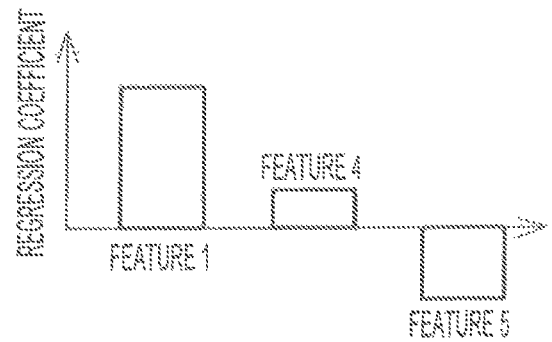

FIG. 7B is a diagram illustrating the regression coefficient of a feature 4 and a feature 5, which are similar features determined to be similar to the feature 1 as the explanatory variable illustrated in FIG. 7A, arranged with the feature 1. The figure illustrates the regression coefficient similarly to FIG. 7A, and thus, illustrates the variation of the objective variable in a case where each of the features increases by one. As illustrated in FIG. 7B, the regression coefficients may be significantly different from each other even when the features are similar to each other. This change comes from how similarity degree is measured and the calculation method of the present embodiment, for example, as described above, in which the correlation coefficient between standardized variables is calculated as similarity degree.

Figure 8A:
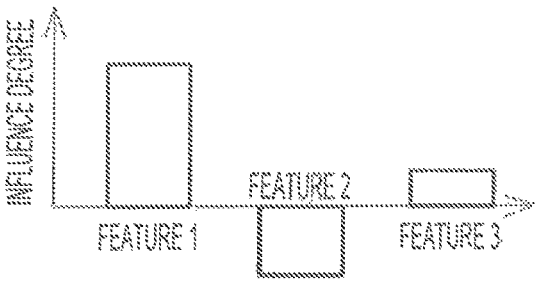
FIGS. 8A and 8B are diagrams illustrating an exemplary result display of influence degrees of explanatory variables and similar features.
Figure 8B:
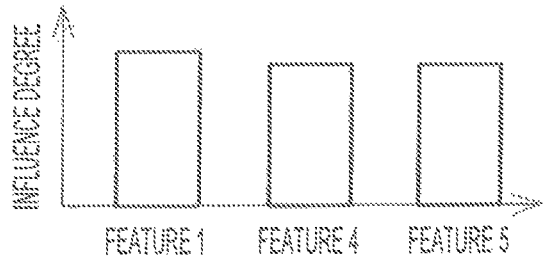

Each of FIGS. 8A and 8B respectively illustrates the influence degrees of the feature 1 as the explanatory variable, the feature 2, and the feature 3, and the influence degrees of the feature 4 and the feature 5, that is, similar features similar to the feature 1 as the explanatory variable, arranged side by side. For example, in these figures, numerical values obtained by multiplying the regression coefficients by the variance of features are graphed.

As illustrated in the graphs for individual features in FIG. 8A, the influence degrees of individual features constituting individual explanatory variables on the objective variables greatly differ from each other depending on the individual features. In contrast, as illustrated in FIG. 8B, unlike the above-described FIG. 7B, in the case of the similar features, the influence degree of the individual features on the objective variables are substantially equal to each other. In this manner, by performing visualized display as a graph, the user can visually observe the influence of the similar feature on the objective variable.

The factor-influence degree display 312 may be configured to output the regression coefficients as illustrated in FIGS. 7A and 7B, or to output the influence degrees as illustrated in FIGS. 8A and 8B. Moreover, these pieces of information may be displayed together. Note that while in FIGS. 7A, 7B, 8A, and 8B similar features of the feature 2 and the feature 3 are not illustrated, they may also be configured to be displayed together, or the desired feature of the explanatory variable for observation may be configured to be switched and displayed by user's operation.

Figure 9:
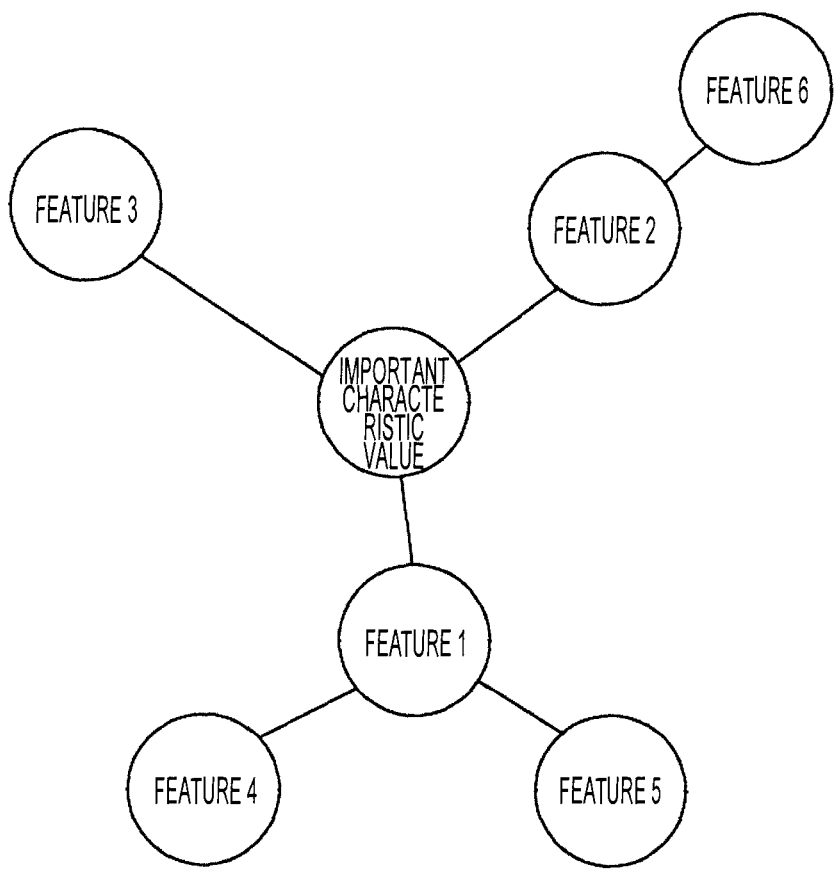
FIG. 9 is a diagram of an exemplary output result illustrated in a network diagram.

Furthermore, as another example, the objective variable, the explanatory variable, and the similar feature may be configured to be displayed in a network diagram (graph). FIG. 9 is a diagram displaying, in a network diagram, the relationship between the important characteristic value and the features, that is, the relationship between the objective variable, the explanatory variable, and the similar feature.

As illustrated in FIG. 9, it is possible to express the important characteristic value (objective variable), the features (explanatory variable and similar feature), the influence of the explanatory variable on the objective variable, and the similarity degree between the similar feature and the explanatory variable. For example, it is also possible to express the objective variable, the explanatory variable, and the feature extracted as the similar feature as a node and express the influence degree or similarity degree as the thickness or length of an edge.

As another example, the influence degree of each of the explanatory variables on the objective variable may be configured to be represented by the size of the node of each of the explanatory variables, and the similarity degree between each of the similar features and the explanatory variable may be configured to be expressed by the size of node of each of the similar features. In this manner, it is allowable to configure to enable the user to intuitively confirm the relevance between a plurality of factors by using an expression as a network diagram. As yet another example, it is allowable to express them by changing the colors of nodes and edges in accordance with the influence degree or similarity degree.

Figure 10:
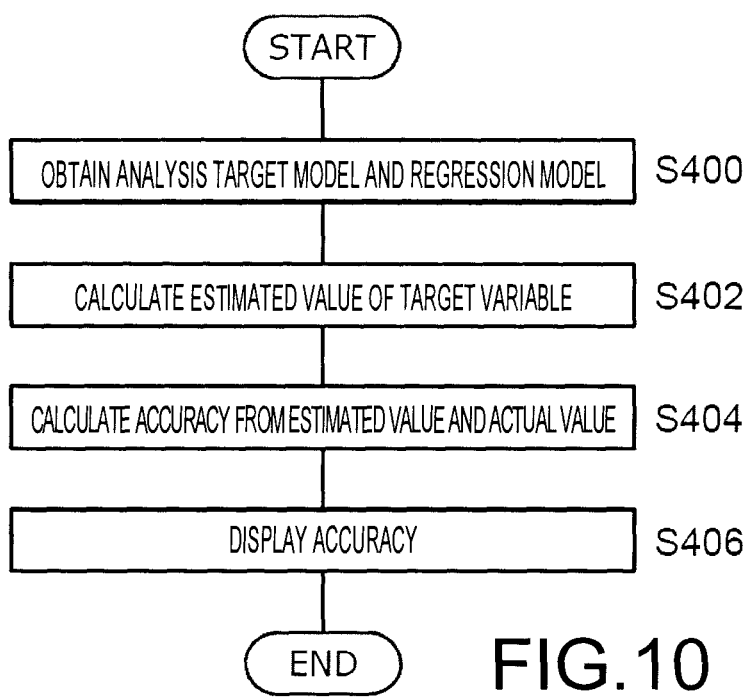
FIG. 10 is a flowchart illustrating exemplary accuracy display processing according to the first embodiment.

Next, processing of displaying the accuracy of the regression model 350 will be described. FIG. 10 is a flowchart illustrating a flow of processing of displaying the accuracy of the regression model 350.

After the regression model construction processing is finished, the accuracy calculator 314 obtains analysis target data stored in the analysis target data storage 302 and the regression model 350 output by the regression model constructor (S400).

Next, the accuracy calculator 314 calculates an estimated value of the objective variable by applying the analysis target data to the regression model (S402).

Next, the accuracy calculator 314 calculates the accuracy of the regression model on the basis of the calculated estimated value and an actual value (S403). The calculated accuracy is stored in the accuracy storage 316.

Next, the accuracy display 318 outputs the accuracy of the regression model stored in the accuracy storage 316 to the user via the user I/F 4 (S406). By confirming the displayed accuracy, the user can grasp to what extent factors can be explained in the regression model. As the display of accuracy, it is allowable to configure to display the calculated accuracy itself, or to express the estimated value and the actual value in a graph. Moreover, it is allowable to display these together.

In this manner, regarding the issue of identifying the factor of variation of the important characteristic value, the analysis apparatus 3 according to the present embodiment extracts the feature that explains the variation of the important characteristic value, constructs a regression model, and extracts features that are similar to the features included in the regression model, thereby extracting the factor of variation that is likely to be overlooked and thus not extracted because of collinearity in the feature extraction in the regression model construction. As a result, it is possible to suppress a false negative result in the extraction of the factor of variation.

Second Embodiment

The analysis processing according to the first embodiment described above performs processing of regression model construction and the similar feature extraction using conversion to dummy variables in a case where a categorical value is included in the data. In contrast, the analysis processing according to the present embodiment performs analysis processing by performing grouping for each of the categorical variables in a case where the categorical value is included in the data. Hereinafter, differences from the above-described first embodiment will be described in detail.

Figure 11:
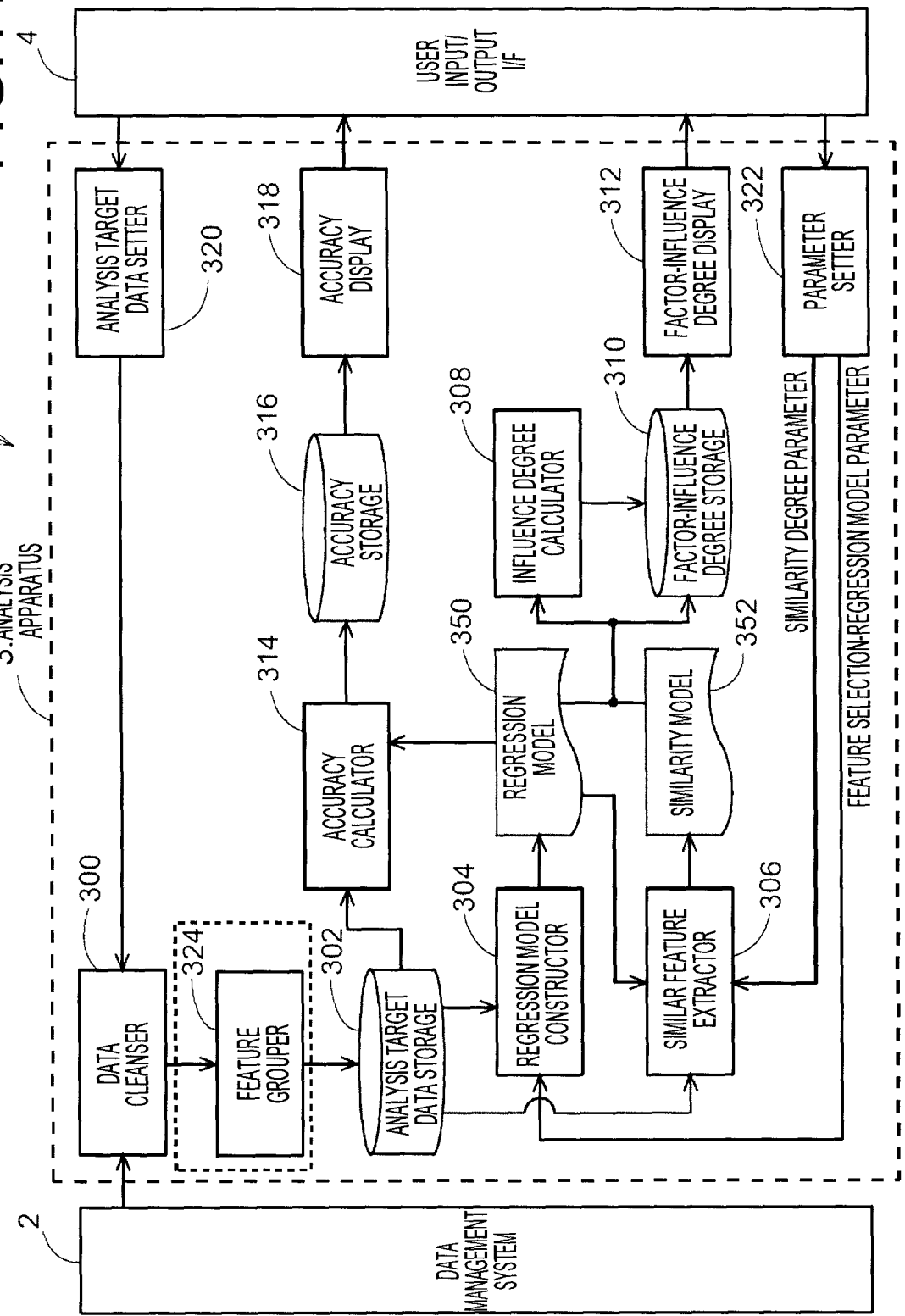
FIG. 11 is a block diagram of an analysis apparatus according to a second embodiment.

FIG. 11 is a block diagram illustrating a configuration of the analysis system 1 according to the present embodiment. As illustrated in FIG. 11, the analysis apparatus 3 according to the present embodiment further includes a feature grouper 324 in addition to the configuration of the above-described first embodiment.

Data observed in plants may include not merely the continuous values measured by the sensor but also categorical values such as machining conditions and devices used. In a case where the categorical value greatly influences the factor of variation, it is possible, in some cases, to control the variation directly by changing the processing conditions or switching the devices used. Therefore, it is important to analyze factors with the categorical values being included.

In a case where the data include a categorical value, it is difficult to construct a regression model and extract similarity features as they are. To cope with this, as described above, a feature is created for each of levels of the categorical values, and a dummy variable that expresses whether the value corresponds to the level by 0 or 1 is introduced. In this manner, the dummy variable value is expressed in a numerical variable of 0 or 1, making it possible to perform processing of regression model construction and similar feature extraction.

Unfortunately, however, merely simply converting the categorical value into the dummy variable would not necessarily work to obtain a correct analysis result because processing of the regression model construction and similar feature extraction is performed for each of the dummy variables. For example, even with a fact that a processing condition A is extracted in a case where either one of the processing condition A and a processing condition B is exclusively satisfied, there is, in many cases, actually a possibility that the condition B influences the important characteristic value and a target of interest is a difference between the condition A and the condition B. In this manner, selection or unselection of the level that was originally the same categorical variable might deteriorate interpretability.

To cope with this, the feature grouper 324 converts the value into dummy variables such that a same category level is defined as one group. FIG. 12 is a diagram illustrating dummy variables grouped in this manner. As illustrated in FIG. 12, the feature grouper 324 groups the data cleansed by the data cleanser and then converted into the dummy variable data.

Specifically, the feature $x_1$ is grouped as a group $g_1$, the feature $x_2$ is grouped as a group $g_2$, that is, each of the features is grouped as a one-variable group, while the feature $x_3$ is grouped such that dummy variables $x_3[A]$, $x_3[B]$, and $x_3[C]$ are collectively grouped as a group $g_3$. In this manner, a set of the dummy variables ($x_3[A]$, $x_3[B]$, and $x_3[C]$) generated from the same categorical data ($x_3$) is grouped as the same group ($g_3$).

In the present embodiment, on the basis of the features grouped in this manner, the regression model constructor 304 and the similar feature extractor 306 execute regression model construction of selecting and extracting the feature for each of the groups, and extraction of a feature, respectively. Note that this grouping need not be limited to those associated with conversion to dummy variables of the categories, and can also be applied to arbitrary grouped variables. For example, in a case, for example, where it is known beforehand that there is a strong positive or negative correlation between certain features $x_n$ and $x_m$, it is also possible to enhance accuracy of regression model construction by grouping these features. As another example, even in a case where there is a plurality of predetermined processing conditions, or the like, and combinations for selecting the processing conditions are determined, it is also effective to group features representing the plurality of processing conditions.

Group Lasso is a penalized regression model that analyzes each of groups. This Group Lasso is a function optimization problem expressed by the following formula.

$$\min_{\beta} \frac{1}{2n} \|y - X\beta\|_2^2 + \lambda \sum_l \sqrt{p_l} \|\beta^l\|_2 \tag{5}$$

Here, $p_l$ is the number of levels in a group l (the number of features included in the group l), and $\beta^l$ is a regression coefficient corresponding to each of the features in the group. For example, in a case where the group g of six variables is $g_1=\{1\}$, $g_2=\{2,3\}$, $g_3=\{4, 5, 6\}$, $p_1=1$, $p_2=2$, $p_3=3$, $\beta^1=\beta_1$, $\beta^2=[\beta_2\ \beta_3]^T$, $\beta^3=[\beta_4\ \beta_5\ \beta_6]^T$, and formula (5) takes a form as follows.

$$\min_{\beta} \frac{1}{2n}\|y - X\beta\|_2^2 + \lambda\left(|\beta_1| + \sqrt{2}\sqrt{\beta_2^2 + \beta_3^2} + \sqrt{3}\sqrt{\beta_4^2 + \beta_5^2 + \beta_6^2}\right) \tag{6}$$

By using Group Lasso, the regression model constructor 304 can perform feature extraction for each of groups. That is, whether to perform selection is determined for each of the groups, and the regression coefficients of the selected groups are all 0, and the regression coefficients of the unselected group are all 0. Note that it is allowable to use not only Group Lasso, but also Fused Lasso and Clustered Lasso, as the regression model. Furthermore, it is also allowable to apply the stepwise technique to each of the groups, or apply a nonlinear technique.

The similar feature extractor 306 calculates the similarity degree between groups and extracts similar features for each of the groups. For example, canonical correlation can be used for similarity degree between groups. When the variables are A and B, the canonical correlation can be considered as the maximum value of the correlation coefficient of a vector obtained by linearly combining A and B with each other. A canonical correlation r is defined as follows using a vector $a \in \mathbb{R}^p$ and $b \in \mathbb{R}^q$ with respect to $A=[A_1, A_2, \ldots, A_p]$ and $B=[B_1, B_2, \ldots, B_q]$ normalized such that the mean is 0.

$$r = \max_{a,b} \frac{a^T A^T B b}{\sqrt{a^T A^T A a} \sqrt{b^T B^T B b}} \quad (7)$$

Moreover, by using the regression coefficient $\beta^l$ of a group $X^l$ selected by the penalized regression model for each of the groups, the similarity degree may be defined as follows. Note that $l \neq k$ in the following formula.

$$r = \max_{\beta^k} \frac{\beta^{lT} X^{lT} X^k \beta^k}{\sqrt{\beta^{lT} X^{lT} X^l \beta^l} \sqrt{\beta^{kT} X^{kT} X^k \beta^k}} \quad (8)$$

This similarity degree r is equal to the square root of the coefficient of determination when regression is performed with $X^l \beta^l$ as an objective variable and $X^k$ as an explanatory variable.

In a case where each of the groups element corresponds to each of the levels of the category, there is an increased possibility of occurrence of multiple collinearity. In such a case, it is allowable to use, as another example, the coefficient of determination of Ridge regression instead of linear regression. The problem of Ridge regression is represented by the following formula.

$$\min_{\beta^k} \frac{1}{2n} \|X^l \beta^l - X^k \beta^k\|_2^2 + \lambda \|\beta^k\|_2^2 \quad (9)$$

The coefficient of determination in solving the above problem can be regarded as the similarity degree between the groups from which multiple collinearity has been removed. Similarly to the above-described first embodiment, in a case where the similarity degree is a predetermined threshold or more, the similar feature extractor 306 extracts a group $X^k$ as a similar group of the group $X^l$ of the explanatory variables. Formula (9) corresponds to construction of a penalized regression model by the explanatory variable group $X^k$ with the influence of $X^l$ on y as the objective variable.

The factor-influence degree display 312 displays a list of groups extracted by the regression model constructor and the similar feature extractor, to the user via the user input/output I/F 4. The list may be prioritized in accordance with the influence degree calculated by the influence degree calculator 308 and displayed in the order of priority.

The influence degree calculator 308 calculates the influence degree of each of the groups on the objective variable as follows. For the feature extracted as an explanatory variable by the regression model constructor 304, it is allowable to determine the regression coefficient of each level as the influence degree, and in addition to this, it is allowable to determine the vector L2 norm obtained by arranging $\sigma(X_j)\beta_j$ for each of variables j included in the group l as the influence degree. By using such an index as the influence degree, it is possible to express the influence of the group.

Similarly, for the similar feature extracted by the similar feature extractor 306, the influence degree calculator 308 can determine the Ridge regression coefficient in formula (9) as the influence degree. As another example, the influence degree calculator 308 may calculate the L2 norm of a vector arranging $\sigma(X_j)\beta_j$ for each of the variables j included in the group k, as the influence degree. By using such an index as the influence degree, it becomes possible to express the influence of the group of similar features on the objective variable.

FIG. 13 is a diagram illustrating an exemplary case where the factor-influence degree display 312 displays regression coefficients as the influence degree of the grouped explanatory variable on the objective variable via the user input/output I/F 4. FIG. 13 indicates that a feature 1-A and a feature 1-B are explanatory variables belonging to group 1, specifically, the feature 1-A is a feature A belonging to group 1 and the feature 1-B a feature B belonging to group 1. The similar applies to other features.

As illustrated in FIG. 13, it is possible to visually display a trend of the influence degree of each of the groups on the objective variable and to display details of the influence degree of each of the explanatory variables belonging to each of the groups on the objective variable.

FIG. 14 is a diagram illustrating the influence degree of one of grouped explanatory variables and the influence degree of the grouped similar features on the objective variable as a regression coefficient in the regression model. In FIG. 14, similarly to FIG. 13, group 1, group 4, and group 5 of each of the features are illustrated. In this manner, it is also possible to display similar features side by side.

Figure 15:
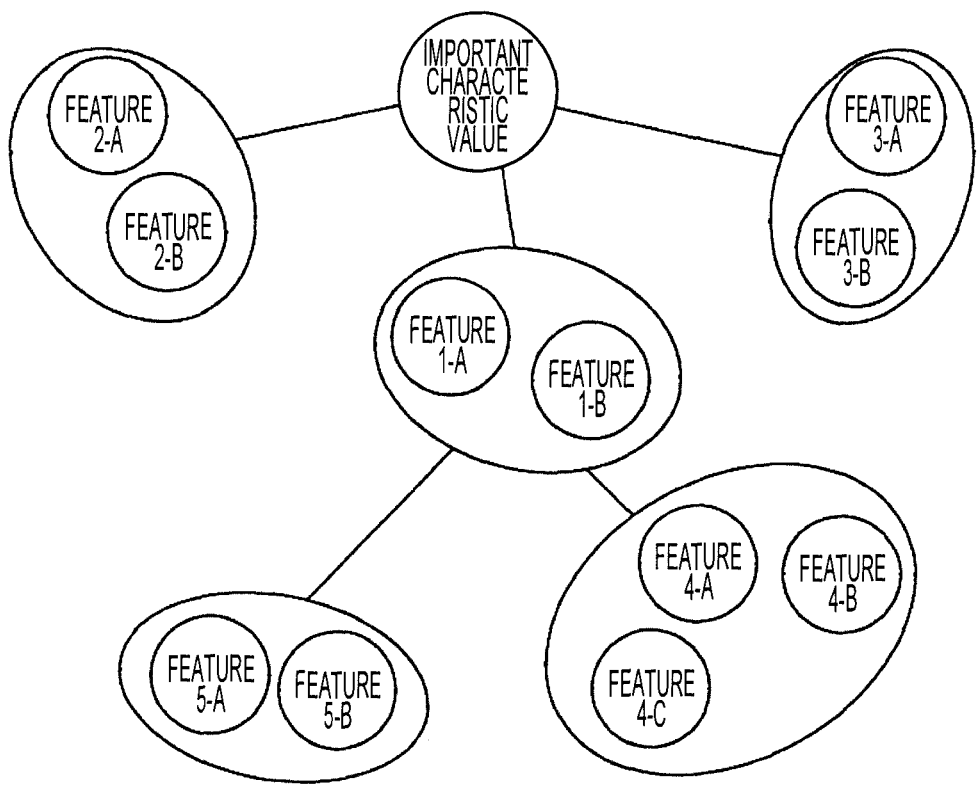
FIG. 15 is a diagram of an exemplary output result illustrated in a network diagram.

FIG. 15 is a network diagram illustrating a relationship between groups, that is, between the grouped important characteristic values (objective variables) and the grouped features (explanatory variables and similar features). Nodes of the feature are included in each of the nodes of the group. As illustrated in the figure, it is visually perceivable that the important characteristic value is strongly influenced by group 1, group 2, group 3 and that group 1 is a group similar to group 4 and group 5. As in the illustration in FIG. 9 described above, it is allowable to express the influence degree or similarity degree by expression of nodes and edges.

Figure 16:
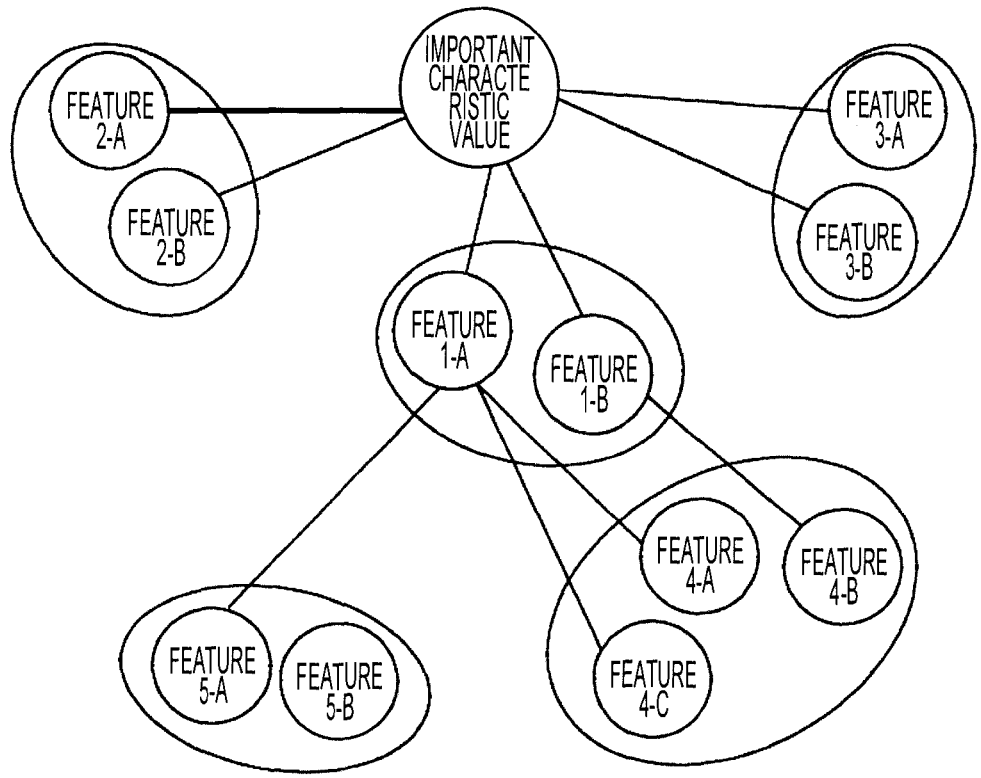
FIG. 16 is a diagram of another example of the output result illustrated in the network diagram.

FIG. 15 is a network diagram illustrating the relationship between the groups, but the relevance to individual features is not illustrated. Therefore, as illustrated in FIG. 16, it is allowable to display a network diagram with each of the features in the group as a node. By displaying in this manner, it is also possible to express the relevance between the groups, and together with this, the relevance between features constituting the group.

For example, as observed from the relationship between group 1 and group 4, the influence of the feature 1-A on the important characteristic value is similar to the influence of a feature 4-A and a feature 4-C, and the influence of amount 1-B on the important characteristic value is similar to the influence of a feature 4-B. It is also conceivable that a specific level included in the feature 5 is not similar to any of the feature 1. By using expression as illustrated in FIG. 16, it is also possible to visually display the relationship between such individual features.

As described above, regarding the issue of identifying the factor of variation of the important characteristic value, the analysis apparatus 3 according to the present embodiment extracts the feature that explains the variation of the important characteristic value, constructs a regression model, and extracts features that are similar to the features included in the regression model, thereby extracting the factor of variation that is likely to be overlooked and thus not extracted because of collinearity in the feature extraction in the regression model construction. Furthermore, with the analysis apparatus 3 according to the present embodiment, by grouping individual features that are difficult to separate from each other as categorical values, it is possible to display the influence of each of the features on the objective variable without causing deterioration of interpretability resulted from simply using the dummy variables.

Figure 17:
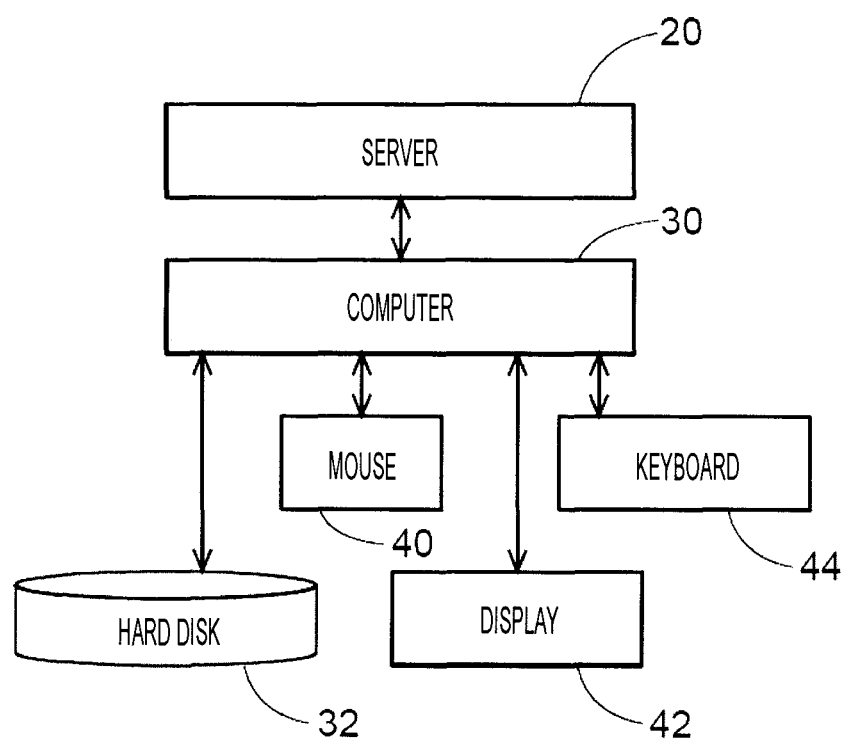
FIG. 17 is a diagram illustrating an exemplary configuration of an analysis system according to the present embodiment.

All of the embodiments described above are carried out through a hardware configuration as illustrated in FIG. 17, for example. Specifically, the analysis apparatus 1 is constructed in a computer 30, and analysis apparatus 1 receives instructions from a user by using a mouse 40 and a keyboard 44 as interfaces. In a hard disk 32, a program which activates the computer 30 and activates the analysis apparatus 1 may be included, and a database which stores and holds input/output data of the analysis apparatus 1 may be constructed. A display 42 is provided as a visual interface, for example, the input/output I/F 4 of the analysis apparatus 1. Server 20 is database and further, it is also possible to provide tools for obtaining desired data from these databases. As another example, the various databases may also be constructed in the hard disk 32 connected to the computer 30.

At least a part of the disease-associated biomarker search device and the disease-associated biomarker search system described in the aforementioned embodiments may also be configured by hardware or software. When configuring the above using the software, it is also possible to design such that a program realizing at least a part of functions of the biomarker search device and the biomarker search system is housed in a recording medium such as a flexible disk or a CD-ROM, and a computer is made to read and execute the program. A storage medium is not limited to a detachable one such as a magnetic disk or an optical disk, and it may also be a fixed-type storage medium such as a hard disk device or a memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A regression analysis apparatus comprising:
a regression model constructor configured to select a plurality of explanatory variables from a plurality of features and simultaneously to construct a regression model that acquires an objective variable that is one of a plurality of features from the plurality of explanatory variables using analysis target data including the plurality of features; and
a similar feature extractor configured to calculate a similarity degree between (A) one or more features belonging to the plurality of features and (B) each of the plurality of explanatory variables, and configured to extract a similar feature having the similarity degree higher than a predetermined value, wherein the one or more features exclude features corresponding to the objective variable and the explanatory variables.

2. The regression analysis apparatus according to claim 1, further comprising a data cleanser configured to obtain and process data including the plurality of features and generate the analysis target data,
wherein the regression model constructor generates the regression model on the basis of the analysis target data generated by the data cleanser, and
the similar feature extractor extracts the similar feature on the basis of the analysis target data generated by the data cleanser and the explanatory variable selected by the regression model constructor.

3. The regression analysis apparatus according to claim 2, wherein the data cleanser further converts categorical data, that is, a variable representing a category among data including the plurality of features, into dummy variable data representing each of categories and generates the analysis target data.

4. The regression analysis apparatus according to claim 1, wherein the regression model constructor constructs the regression model by selecting the explanatory variable on the basis of a penalized regression model.

5. The regression analysis apparatus according to claim 1, wherein the similar feature extractor calculates a similarity degree by calculating a correlation coefficient between each of data that are included in the analysis target data and that are other than the objective variable and other than the explanatory variable, and each of the explanatory variables.

6. The regression analysis apparatus according to claim 1, further comprising an influence degree calculator configured to calculate an influence degree of the explanatory variable on the objective variable and an influence degree of the similar feature on the objective variable.

7. The regression analysis apparatus according to claim 6, wherein the influence degree of the explanatory variable on the objective variable is an index indicating an influence of each of the explanatory variables on the objective variable on the basis of the regression model.

8. The regression analysis apparatus according to claim 6, comprising an outputter configured to output data including at least one of the influence degree of the similar feature on the objective variable and a similarity degree between the similar feature and the explanatory variable, as output data.

9. The regression analysis apparatus according to claim 8, wherein the outputter
expresses the objective variable, the explanatory variable, and the similar feature as nodes,
connects the objective variable with the explanatory variable by an edge on the basis of the influence degree of the explanatory variable on the objective variable, and
outputs a network diagram connecting the explanatory variable with the similar feature by the edge as the output data on the basis of the similarity degree between the explanatory variable and the similar feature.

10. The regression analysis apparatus according to claim 9, wherein one of the influence degree of the explanatory variable on the objective variable and the similarity degree between the explanatory variable and the similar feature is displayed by states of the nodes and the edges.

11. The regression analysis apparatus according to claim 1, further comprising a feature grouper configured to group the plurality of features included in the analysis target data,
wherein the regression model constructor constructs the regression model that represents the objective variable by a grouped explanatory variable corresponding to any one group of the plurality of grouped features and by a regression coefficient of the feature included in the grouped explanatory variable by performing regression analysis using the plurality of grouped features, and
the similar feature extractor extracts the similar feature for the grouped explanatory variable and for the grouped analysis target data.

12. The regression analysis apparatus according to claim 2, further comprising a feature grouper configured to group the plurality of features included in the analysis target data,
wherein the regression model constructor constructs the regression model that represents the objective variable by a grouped explanatory variable corresponding to any one group of the plurality of grouped features and by a regression coefficient of the feature included in the grouped explanatory variable by performing regression analysis using the plurality of grouped features,
the similar feature extractor extracts the similar feature for the grouped explanatory variable and for the grouped analysis target data,
the data cleanser converts categorical data as variables indicating categories among the data including the feature into dummy variable data indicating each of the categories, and
the feature grouper groups a set of the dummy variable data converted from the same categorical data as a same group.

13. The regression analysis apparatus according to claim 11, wherein the regression model constructor constructs the regression model on the basis of a penalized regression model for each of the grouped explanatory variables, and
the similar feature extractor extracts the similar feature for each of the grouped explanatory variables and for each of the plurality of grouped features.

14. The regression analysis apparatus according to claim 1, further comprising a regression model accuracy calculator configured to calculate accuracy of the regression model, wherein the similar feature extractor selects the plurality of features on the basis of the calculated accuracy of the regression model, and adjusts the extracted feature on the basis of a parameter that constructs the selected regression model and a parameter that extracts the selected similar feature.

15. The regression analysis apparatus according to claim 14, wherein the regression model constructor reconstructs the regression model on the basis of the accuracy of the regression model calculated by the regression model accuracy calculator.

16. The regression analysis apparatus according to claim 14, wherein the similar feature extractor re-extracts the similar feature on the basis of the accuracy of the regression model calculated by the regression model accuracy calculator.

17. A regression analysis method comprising:
selecting, by a regression model constructor, a plurality of explanatory variables from a plurality of features and simultaneously constructing, by the regression model constructor, a regression model that represents an objective variable with the plurality of explanatory variables and with a regression coefficient of the plurality of explanatory variables by performing regression analysis using analysis target data including the plurality of features with one of the plurality of features as the objective variable; and
performing, by a similar feature extractor, calculation of a similarity degree between (A) one or more features belonging to the plurality of features and (B) each of the plurality of explanatory variables, and extraction of a similar feature having the similarity degree higher than a predetermined value, wherein the one or more features exclude features corresponding to the objective variable and the explanatory variables.

18. A non-transitory computer readable medium for causing a computer to function as:
a regression model constructor that selects a plurality of explanatory variables from a plurality of features and simultaneously constructs a regression model that represents an objective variable with the plurality of explanatory variables and with a regression coefficient of the plurality of explanatory variables, by performing regression analysis using analysis target data including the plurality of features with one of the plurality of features as the objective variable;
a similar feature extractor that calculates a similarity degree between (A) one or more features belonging to the plurality of features and (B) each of the plurality of explanatory variables, and extracts a similar feature having the similarity degree higher than a predetermined value; and
an outputter that outputs output data including data related to the analyzed similar feature,
wherein the one or more features exclude features corresponding to the objective variable and the explanatory variables.

* * * * *